S. L. STOCKSTILL & H. D. KUTZ.
Plows.

No. 137,870. Patented April 15, 1873.

Witnesses:
E. Wolff
C. Sedgwick

Inventor:
S. L. Stockstill
H. D. Kutz
Per
Attorneys.

UNITED STATES PATENT OFFICE.

STEPHEN L. STOCKSTILL, OF MEDWAY, OHIO, AND HENRY D. KUTZ, OF HARRISBURG, PENNSYLVANIA.

IMPROVEMENT IN PLOWS.

Specification forming part of Letters Patent No. 137,870, dated April 15, 1873; application filed September 7, 1872.

*To all whom it may concern:*

Figure 1:
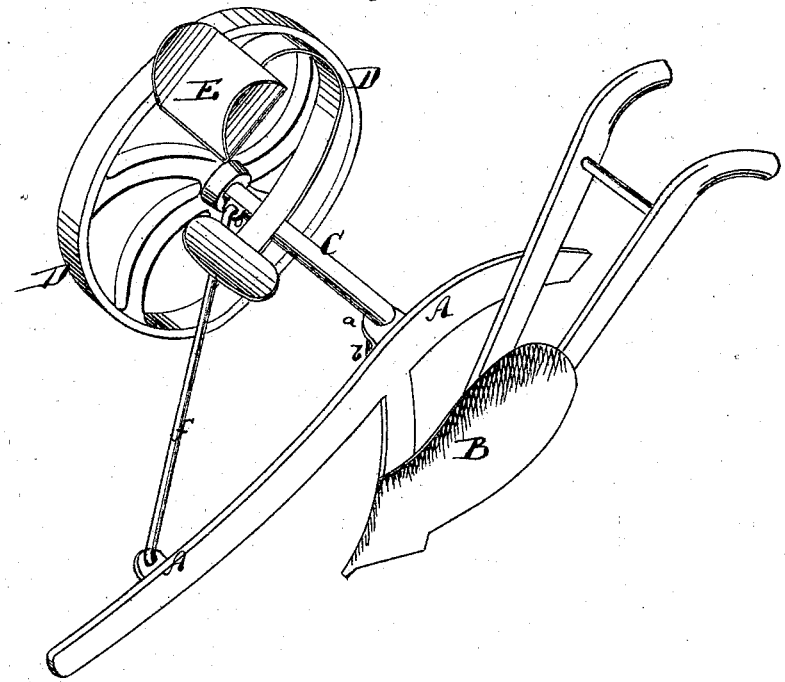
Figure 2:
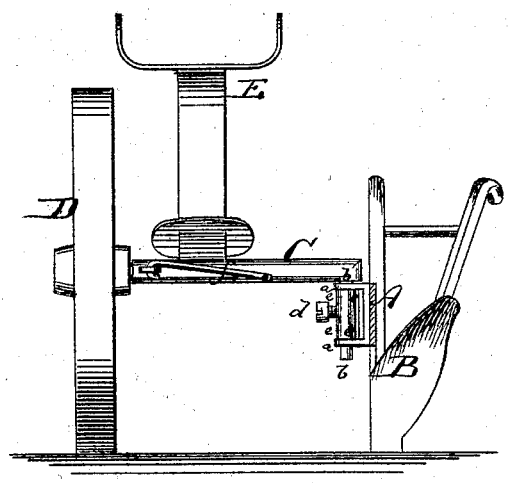

Be it known that we, STEPHEN L. STOCKSTILL, of Medway, in the county of Clark and State of Ohio, and HENRY D. KUTZ, of Harrisburg, in the county of Dauphin and State of Pennsylvania, have invented a new and Improved Plow, of which the following is a specification:

In the accompanying drawing, Figure 1 is a perspective view of our improved plow. Fig. 2 is a front elevation, partly in section, of the same.

Similar letters of reference indicate corresponding parts.

Our invention is an improvement in the class of plows provided with one wheel, or connected to and supporting one end of an axle having a wheel on the other end; and the improvement consists in the adjustable connection between the axle and plow-beam.

A in the drawing represents the plow-beam; B, the plow-share, of suitable kind and size. On the land-side of beam A are projecting ears $a\ a$, which are perforated to receive a vertical pin, $b$. This pin is formed at the end of the axle C of the wheel D, and can be adjusted up and down in the ears, and fastened at the desired height by a set-screw, $d$, nut, or other device. When using the screw $d$ we propose to fit a tube, $e$, between the two ears $a$, loose around the pin $b$, and apply the screw to the tube, as shown. This will allow the screw to be brought against the pin $b$ at any desired height. The wheel D is hung loose to the outer end of the axle C, and the latter is braced, near the wheel, by a rod, $f$, leading to the front part of the plow-beam. E is the driver's seat, having a spring support, which is secured to the axle near the wheel.

The driver, when leaning backward, will carry the point of the plow out of the soil, and will drive it further in when leaning forward.

Having thus described our invention, what we claim as new, and desire to secure by Letters Patent, is—

The plow-beam, provided with perforated ears $a\ a$, and the pin $b$ formed on the end of the axle C, the sleeve $e$, and set-screw $d$, all arranged as shown and described, for the purpose of allowing vertical adjustment of the axle, as specified.

HENRY D. KUTZ.
STEPHEN L. STOCKSTILL.

Witnesses to KUTZ's signature:
   C. SEDGWICK,
   ALFRED LURCOTT.

Witnesses to STOCKSTILL's signature:
   W. R. DILLE,
   J. A. STOCKSTILL.